Patented Dec. 18, 1928.

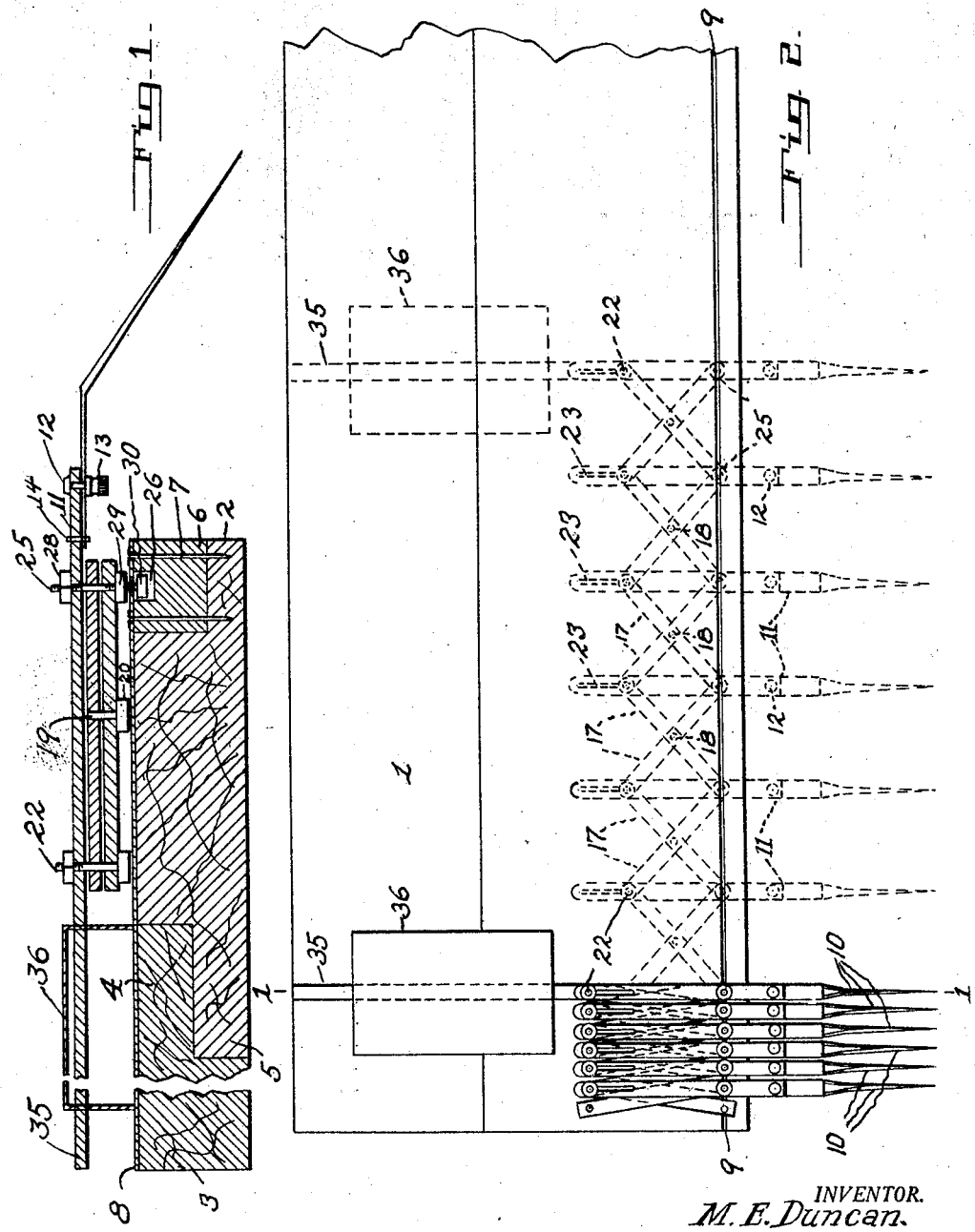

1,695,457

UNITED STATES PATENT OFFICE.

MERRITT E. DUNCAN, OF ATLANTA, GEORGIA.

AUTOMATIC PEN-SETTING ATTACHMENT.

Application filed July 13, 1927. Serial No. 205,519.

This invention relates to ruling pens and has for its object the automatic positioning of the pens at proper distances from each other whenever it is necessary to change the distance between the pens.

A second object of the invention is to provide a support for the pens and means cooperating with the support to maintain the pens at uniform distances apart in all positions of the pens.

Another object of the invention is to provide means for easily adjusting the pens relatively to each other and holding them in their adjusted positions after they have been located the one to the other.

With these and other objects in view which will become apparent as the description proceeds, I will now describe my invention in connection with the accompanying drawings in which:

Figure 1 is a sectional view of the pens and support on the line 1—1 of Fig. 2.

Fig. 2 is a top plan view of the same.

On a support 1 which may conveniently be composed of wooden beams 2 and 3 with overlapping portions 4, 5, I support the apparatus for manipulating the pens. The beam 2 may conveniently be mortised at its end and a steel beam 6 fitted into the mortise as shown best in Fig. 1. The steel beam is held in place by bolts 7 and I conveniently cover the top of the support by a metal plate 8 having a slot 9 therein extending the length of the support. The pens 10—10 are of metal doubled or folded as shown best in Fig. 2 and supported by bars 11—11, the pens being attached to the bars by bolts 12 having nuts 13 thereon to clamp the pens to the bars. Additional bolts 14 may be passed through the bars and pens to hold the pens rigidly fixed to the bars.

The bars 11 carrying the pens have pivoted crossed levers 17 between them, the crossed levers being pivoted to each other at 18—18 by rivets 19 which may have nuts 20 at their lower ends for adjustment. The crossed bars being further pivoted to each other by bolts 22 working in slots 23 in the upper end of the bars 11.

In the lower ends of the cross bars are bolts 25—25 which pass through the bars 11, the cross bars 17 and slot 9 and terminate in a slot 26 in the steel beam 6. The bolts 25 may have nuts 28, 29, thereon and heads 30 in the slot 26 to hold the bars to the support, the slots 23 in the bars permitting the cross bars with the pivot bolts 22 to rise and fall as the bars are separated or pushed together, the bolts 25 being constrained by the slot 9 to move in a straight line when the bars are separated or pushed together.

One of the bars 11 at the extreme right of the series of bars may have a continuation 35 with a metal box or cover 36 to hold the ink pads and serve as a convenient handle to be grasped and to separate or push together the bars, the cover resting on the support 2.

To assemble the pens and bars on the support it is only necessary to insert the heads 30 of the bolts 25 successively in the groove 26 of the steel beam 6 and the nut 29 is screwed downwardly as in Figure 1 to clamp the edges of the slot between said nut 29 and the head 30, and having located the distance between any two of the pens, the distance between any two of the other pens will be automatically fixed by reason of the connecting cross bars 17 and their connections to the bars 11 and the bolts 25 running in the slot 9.

The pens are supplied with ink by threads commonly called zephyrs which, being old, are not illustrated in the drawings. The inking pads may conveniently be confined in the cover 36 attached to the extension of a bar 11.

With the arrangement described, I have produced the series of ruling pens easily manipulated and the distance between two pens having been fixed, the distance between the other pens will automatically, by the mechanism shown, be maintained at the same distances from each other.

I claim as my invention:

1. Automatic pen setting mechanism comprising a support having a groove therein, a series of bars, pens carried by the bars, cross bars with bolts passing through both said bars and cross bars and extending into the groove in the support and having means thereon to clamp the edges of the groove.

2. An automatic pen setting mechanism comprising a support, a beam extending transversely thereof and having a groove in its upper portion, a metal cover for the support having a slot extending over the groove, a series of bars carrying pens at their ends, cross bars pivoted near their centers to each other and having headed bolts at their ends extending through the slot into the groove of said support.

3. Automatic pen setting mechanism comprising a support, a metal beam extending transversely thereof and having a groove in its upper portion, a metal cover for the support having a slot smaller than and extending over the groove, a series of bars having pens on their ends, said bars being connected by cross bars pivoted together in pairs at their middle portions and to said bars at their ends, bolts extending through said bars and cross bars and on which the ends of the cross bars are pivoted, said bars having slots at their ends remote from the pens in which some of said bolts operate, other bolts operating in the grooves in said support.

In testimony whereof I affix my signature.

MERRITT E. DUNCAN.